US007610363B2

(12) United States Patent
Kim et al.

(10) Patent No.: US 7,610,363 B2
(45) Date of Patent: Oct. 27, 2009

(54) METHOD OF ALLOCATING AN INTERNET PROTOCOL ADDRESS IN A BROADBAND WIRELESS ACCESS SYSTEM

(75) Inventors: Yong Ho Kim, Bucheon-si (KR); Ki Seon Ryu, Seoul (KR); Yong Won Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 393 days.

(21) Appl. No.: 11/356,547

(22) Filed: Feb. 16, 2006

(65) Prior Publication Data

US 2006/0206597 A1    Sep. 14, 2006

(30) Foreign Application Priority Data

Feb. 16, 2005   (KR)   ....................... 10-2005-0012609

(51) Int. Cl.
*G06F 15/16* (2006.01)
(52) U.S. Cl. .................... 709/220; 709/230; 455/452.1; 455/436
(58) Field of Classification Search ................. 709/217, 709/218, 220, 221, 222, 223, 224, 230; 455/452.1, 455/436
See application file for complete search history.

(56) References Cited

U.S. PATENT DOCUMENTS

| 6,915,325 | B1 * | 7/2005 | Lee et al. | 709/202 |
|---|---|---|---|---|
| 2002/0019880 | A1 * | 2/2002 | Sakakura | 709/245 |
| 2002/0118656 | A1 * | 8/2002 | Agrawal et al. | 370/329 |
| 2003/0031156 | A1 * | 2/2003 | Omae et al. | 370/338 |
| 2003/0043781 | A1 * | 3/2003 | Proctor et al. | 370/352 |
| 2004/0090958 | A1 * | 5/2004 | Park et al. | 370/389 |
| 2004/0203783 | A1 | 10/2004 | Wu et al. | |
| 2005/0272481 | A1 * | 12/2005 | Kim | 455/574 |
| 2006/0083212 | A1 * | 4/2006 | Colban et al. | 370/349 |
| 2006/0215595 | A1 * | 9/2006 | Hancock et al. | 370/328 |
| 2008/0037478 | A1 * | 2/2008 | Na et al. | 370/338 |
| 2008/0287138 | A1 * | 11/2008 | Yoon et al. | 455/452.2 |

OTHER PUBLICATIONS

Chan J. et al., "Integrating mobility prediction and resource pre-allocation into a home-proxy based wireless internet framework," IEEE International Conference on Networks.
Ozugurt T. et al., "Fast IPv4/IPv6 address acquisition in wireless LANs" Consumet Communications and Netowrking Conference, CCNC 2004.
Lee et al. "Minimization of Handoff interruption time optimizing IP Address Assignment Procedure", IEEE 802.16 Broadband Wireless Access Working Group, IEEE C802.16e-04/51r1, May 18, 2004.

\* cited by examiner

*Primary Examiner*—Moustafa M Meky
(74) *Attorney, Agent, or Firm*—Lee, Hong, Degerman, Kang & Waimey

(57) ABSTRACT

A method of reconfiguring an internet protocol (IP) address during handover by a mobile station (MS) is disclosed. In the method, the MS transmits a ranging request message to a base station (BS) in a network and then receives a ranging response message which includes a IP address refresh parameter from the BS in the network. Thereafter, the MS transmits an IP address configuration network entity search message via the BS, receives an IP address configuration network entity search result message from the network via the BS, and transmits an IP address configuration request message to the network via the BS. Lastly, the MS receives an IP address configuration response message from the network via the BS.

30 Claims, 14 Drawing Sheets

METHOD OF ALLOCATING AN INTERNET PROTOCOL ADDRESS IN A BROADBAND WIRELESS ACCESS SYSTEM

This application claims the benefit of Korean Application No. P2005-12609, filed on Feb. 16, 2005, which is hereby incorporated by reference.

BACKGROUND OF THE INVENTION

1. Field of the Invention

The present invention relates to a method of allocating an internet protocol address, and more particularly, to a method of allocating an internet address in a broadband wireless access system.

2. Discussion of the Related Art

A structure of a network that supports a mobile internet protocol (IP) includes, inter alia, a Home Agent (HA), a Foreign Agent (FA), and a mobile station (MS). For operation of the mobile IP, processes such as agent discovery, registration, and routing are necessary.

In detail, the agent discovery process determines whether the MS is currently connected to the home network or whether the MS is located in a foreign network. If the MS has moved to a different or foreign network, new (now current) location information is sent to the HA during the registration process so that the MS can continue. to receive the same service received at the home network. When the MS is registered to a foreign network, the routing process is used to route datagram transmitted or received by the MS.

There are two methods available in the mobile IP in determining Care of Address (CoA) when the MS has moved to a different subnet. A FA-CoA is provided by the FA via an Agent Advertisement message, and the IP address of the FA is used as the CoA. A co-located CoA is a scheme by which the MS receives the CoA via a Dynamic Host Configuration Protocol (DHCP) located in the foreign network.

According to the conventional art, when the MS performs handover with a BS of an Access Service Network (ASN) which belongs to another subnet, the MS has to re-establish the IP address in order for the MS to continue to receive the IP service. If the MS is using a service sensitive to delay, such as Voice over Internet Protocol (VoIP), there is delay from the DHCP server address allocation procedure to registering with a new CoA for re-establishing the IP address. This type of delay decreases quality of real time traffic and capability of data communication.

SUMMARY OF THE INVENTION

Accordingly, the present invention is directed to a method of allocating an internet protocol address in a broadband wireless access system that substantially obviates one or more problems due to limitations and disadvantages of the related art.

An object of the present invention is to provide a method of reconfiguring an internet protocol (IP) address during handover by a mobile station (MS).

Another object of the present invention is to provide a method of reconfiguring an internet protocol (IP) address during handover in a network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of reconfiguring an internet protocol (IP) address during handover by a mobile station (MS) is disclosed. In the method, the MS transmits a ranging request message to a base station (BS) in a network and then receives a ranging response message which includes a IP address refresh parameter from the BS in the network. Thereafter, the MS transmits an IP address configuration network entity search message via the BS, receives an IP address configuration network entity search result message from the network via the BS, and transmits an IP address configuration request message to the network via the BS. Lastly, the MS receives an IP address configuration response message from the network via the BS.

In another aspect of the present invention, the MS transmits a ranging request message to a base station (BS) in a network and receives from the BS in the network a ranging response message which includes a IP address refresh parameter. Thereafter, the MS receives from a first entity of the network an IP address configuration response message, wherein the IP address configuration is attained by the first entity of the network from a second entity of the network.

In further aspect of the present invention, a method of reconfiguring an internet protocol (IP) address during handover in a network includes receiving by a base station (BS) a ranging request message from a mobile station (MS), transmitting by the BS a ranging response message which includes a IP address refresh parameter, and receiving from the MS an IP address configuration network entity search message. The method further includes transmitting to the MS an IP address configuration network entity search result message, receiving an IP address configuration request message from the MS, and transmitting an IP address configuration response message to the MS.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
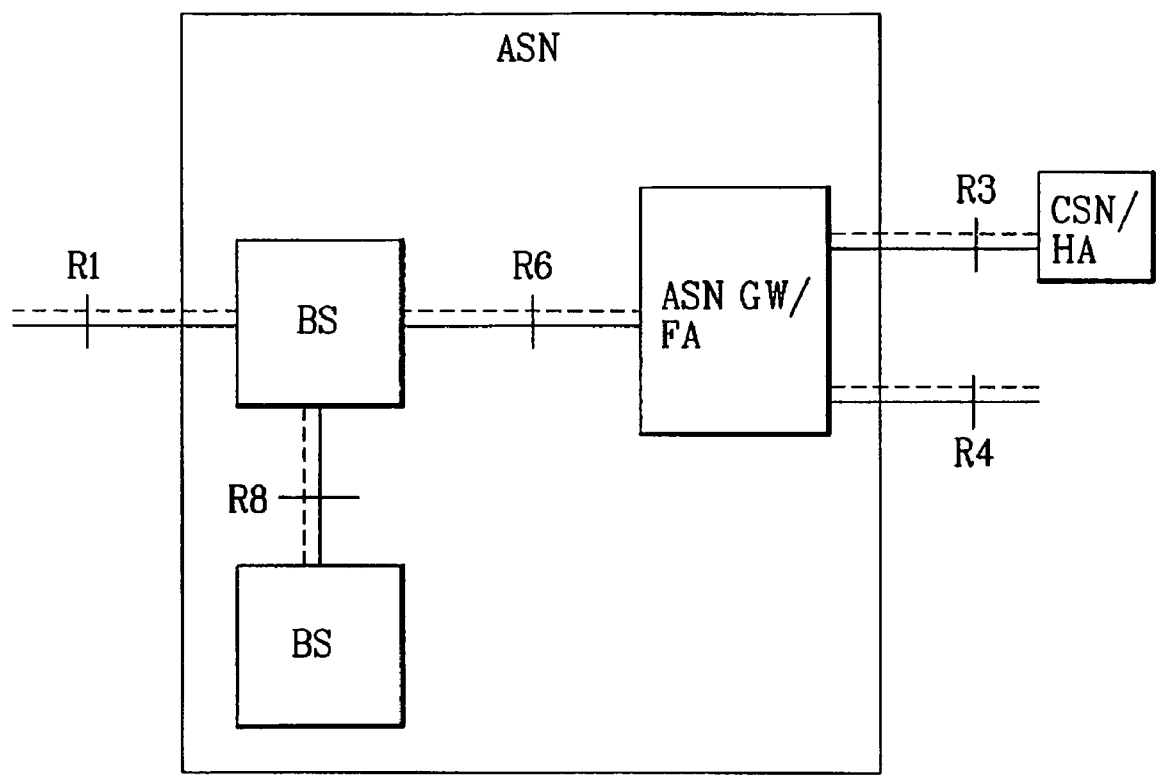
FIG. 1 is an exemplary diagram of a broadband wireless access system.

Reference will now be made in detail to the preferred embodiments of the present invention, examples of which are illustrated in the accompanying drawings. Wherever possible, the same reference numbers will be used throughout the drawings to refer to the same or like parts.

Table 1 is an example of an agent advertisement message broadcasted from a mobile IPv4.

The agent advertisement message of above Table 1 can be used when information on FA/HA are broadcasted in the mobile IP from the agent to the MS.

The DHCP is a protocol which allows the network managers to control and allocate the IP addresses from the center of the network. When the computer users in the network access the internet, each computer must have an IP address allocated thereto. In other words, the DHCP allows the network managers control and allocate the IP addresses from the center of the network and allocates a new IP address when a computer changes location within the network.

The DHCP employs a 'lease' scheme whereby the allocated IP address is effective at the computer for a specified period of time. Here, the specified period of time can vary depending on the user's need for internet access at the specific location. Even if a number of computer users seeking internet access exceeds a number of available IP addresses, the DHCP still limits the lease period of the IP address to a minimum so that the IP addresses can be re-used and distributed dynamically.

A process of dynamically reconstructing the network is achieved by a DHCP client and a DHCP server. More specifically, each client requests an IP address from the DHCP server when the system (e.g., MS) is powered on or started. When the system receives the IP address from the DHCP server, a TCP/IP is configured to the system and thereafter, the system begin communication using a different host and TCP/IP protocol.

The role of the DHCP server is to respond to the DHCP client's request for an IP address by providing the IP address. In so doing, the DHCP server not only allocates the IP addresses, but at the same time, the DHCP server manages the scope of the available IP addresses.

Table 2 is an example of a DHCP message format.

TABLE 1

| Vers = 4 | IHL | Type of Service | | Total Length | | IP |
|---|---|---|---|---|---|---|
| | Identification | | Flags | Fragment Offset | | Header |
| Time to Live = 1 | Protocol = ICMP | | Header Checksum | | | [RFC791] |
| Source Address = home and/or foreign agent address on this link | | | | | | |
| Destination Address = 255.255.255.255 (broadcast) or 224.0.0.1(multicast) | | | | | | |
| Type = 9 | Code | | Checksum | | | ICMP |
| Num Addrs | Addrs Entry Size | | Life Time(of this Advertisement) | | | Router Advertisement |
| | Router Address [1] | | | | | [RFC 1256] |
| | Preference Level [1] | | | | | |
| | Router Address [2] | | | | | |
| | Preference Level [2] | | | | | |
| | ... | | | | | |
| Type = 16 | Length | | Sequence Number | | | Mobility |
| (maximum) Registration Lifetime | | R B H | F M G V | reserved | | Agent |
| | Care-of Address[1] | | | | | Advertisement |
| | Care-of Address[2] | | | | | Extension |
| | ... | | | | | [RFC 2002] |
| Type = 19 | Length | | Prefix-length [1] | | Prefix-Length [2] | Prefix-Length Extenstion (optional) [RFC 2002] |
| | ... | | | | | |

TABLE 2

| 0 | 8 | 16 | 24 | 31 |
|---|---|---|---|---|
| OP | HTYPE | HLEN | | HOPS |
| TRANSACTION IDENTIFIER | | | | |
| SECONDS ELAPSED | | FLAGS | | |
| CLIENT IP ADDRESS | | | | |
| YOUR IP ADDRESS | | | | |
| SERVER IP ADDRESS | | | | |
| ROUTER IP ADDRESS | | | | |
| CLIENT HARDWARE ADDRESS (16 OCTETS) | | | | |
| . | | | | |
| . | | | | |
| . | | | | |
| SERVER HOST NAME (64 OCTETS) | | | | |
| . | | | | |
| . | | | | |
| . | | | | |
| BOOT FILE NAME (128 OCTETS) | | | | |
| . | | | | |
| . | | | | |
| . | | | | |
| OPTIONS (VARIABLE) | | | | |
| . | | | | |
| . | | | | |
| . | | | | |

Table 3 shows types and uses of the DHCP messages.

TABLE 3

| Message | Use |
|---|---|
| DHCPDISCOVER | Client broadcast to locate available servers. |
| DHCPOFFER | Server to client in response to DHCPDISCOVER with offer of configuration parameters. |
| DHCPREQUEST | Client message to servers either (a) requesting offered parameters from one server and implicitly declining offers from all others, (b) confirming correctness of previously allocated address after, e.g., system reboot, or (c) extending the lease on a particular network address. |
| DHCACK | Server to client with configuration parameters, including committed network address. |
| DHCPNAK | Server to client indicating client's notion of network address is incorrect (e.g., client has moved to new subnet) or client's lease as expired. |
| DHCPDECLINE | Client to server indicating network address is already in use. |
| DHCPRELEASE | Client to server relinquishing network address and canceling remaining lease. |
| DHCPINFORM | Client to server, asking only for local configuration parameters; client already has externally configured network address. |

The procedure of handover of the MS from a base station (BS) to another BS will be explained in detail below.

In operation, the MS can acquire information on neighboring base stations by using a neighboring advertisement (MOB-NBR-ADV) message from a serving BS or by scanning for neighboring base stations from the serving BS. Moreover, a decision to perform handover with a different BS can be made by the MS or the serving BS.

After changing to a target BS through handover and thereafter receiving a ranging request (RNG-REQ) message, the MS then receives a ranging response (RNG-RSP) message from the BS. Table 4 is an example of a ranging response (RNG-RSP) message.

TABLE 4

| Syntax | Size | Notes |
|---|---|---|
| RNG-RSP__Message__Format( ){ | | |
| Management Message Type = 5 | 8 bits | |
| Uplink Channel ID | 8 bits | |
| TLV Encoded Information | variable | TLV specific |
| } | | |

The MS scans the target BS in order to synchronize with the downlink channels. Moreover, the MS performs ranging operation with the target BS for re-entry into the network. After the handover to a different (or new) BS, the MS terminates all services with the previous BS. Table 5 illustrates type, length, field (TVL) of a ranging response (RNG-RSP) message for re-establishing service flow during network re-entry.

TABLE 5

| Name | Type (1 byte) | Length | Value (Variable-length) |
|---|---|---|---|
| Service Level Prediction | 17 | 1 | This Value indicates the level of service the MS can expect from this BS. The following encodings apply<br>0=No service possible for this MS<br>1=Some service is available for one or several Service Flows authorized for the MSS.<br>2=For each authorized Service Flow, a MAC connection can be established with QoS specified by the Authorized QoS paramSet<br>3=No service level predication available. |
| Global Service Class Name | nn | 6 | |
| QoS Parameters | [145/146] Variable | Variable | Compound TLV incorporation one or more 11.13 QoS Parameter Set definition encodings. |
| SFID | [145/146] .14 | 4 | |

TABLE 5-continued

| Name | Type (1 byte) | Length | Value (Variable-length) |
|---|---|---|---|
| Resource Retain Flag | 20 | 1 | This value indicates whether the former Serving BS retain the connection information of the MS. 0=the connection information for the MS is deleted 1=the connection information for the MS is retained |
| Service Level Prediction | 17 | 1 | This value indicates the level of service the MS can expect from this BS. The following encodings apply: 0=No service possible for this MS 1=Some Service is available for one or several service flows authorized for the MS 2=For each authorized service flow, a MAC connection can be established with QoS specified by the Authorized QoS ParamSet 3=No service level prediction available |
| Global Service Class Name | nn18 | 4 | |
| QoS Parameters | [145/146] Variable | Variable | Compound TLV incorporating one or more 11.13 QoS Parameter Set definition encodings |
| SFID | [145/146].1 | 4 | |
| Resource Retain Flag | 20 | 1 | This value indicates whether the former serving BS retains the connection information of the MS. 0=the connection information for the MS is deleted. 1=the connection information for the MS is retained. |
| HO Process Optimization | nn21 | 1 | For each Bit location, a value of '0' indicates the associated re-entry management messages shall be required, a value of '1' indicates the re-entry management message may be omitted. Regardless of the HO Process Optimization TLV settings, the Target BS may send unsolicited SBC-RSP and/or REG-RSP management messages Bit#0: Omit SBC-REQ/RSP management messages during current re-entry processing Bit#1: Omit PKM-REQ/RSP management messages during current reentry processing Bit#2: Omit REG-REQ/RSP management during current reentry processing Bit#3: Omit Network Address Acquisition management messages during current reentry processing Bit#4: Omit Time of Day Acquisition management messages during current reentry processing Bit#5: Omit TFTP management messages during current re-entry processing Bit#6: Full service and operational state transfer or sharing between serving BS and target BS (ARQ, timers, counters, MAC state machines, etc..) Bit #7: post-HO re-entry MS DL data pending at target BS |
| HO ID | 22 | 1 | The identifier assigned to a MS during HO by a target BS |
| Location Update Response | 23 | 1 | 0x00=Failure of Location Update. The MS shall perform Network Re-entry from Idle Mode 0x01=Success of Location Update 0x10, 0x11: Reserved |
| Paging Information | 24 | 4 | Paging Information shall only be included if Location Update Response=0x01 and if Paging Information has changed Bits 15:0-Paging_Cycle-cycle in which the paging message is transmitted within the paging group Bits 23:16-Paging OFFSET-Determines the frame within the cycle in which the paging message is transmitted. Must be smaller than PAGING Group ID-ID of the paging group the MSS is assigned to |

TABLE 5-continued

| Name | Type (1 byte) | Length | Value (Variable-length) |
|---|---|---|---|
| Paging Controller ID | 25 | 4 | This is a logical network identifier for the serving BS or other network entity retaining MS service and operational information and/or administering paging activity for the MS while in Idle Mode. Paging Controller ID shall only be included if Location Update Response=0x01 and if Paging Controller ID has changed |
| Next Periodic Ranging | 26 | 2 | This value indicates offset of the frame in which the periodic ranging will be performed with respect to the frame where RNG-RSP is transmitted. This TLV encoding is included in RNG-RSP message only when its ranging status is 'success' If MS receives RNG-RSP message with 'Next Periodic Ranging'=0, it shall terminate Sleep Mode and return to Normal Operation. |
| Power Saving Class Parameter | | Variable | Compound TLV to specify Power Saving Class definition and/or operation |

FIG. 1 is an exemplary diagram of a broadband wireless access system. In FIG. 1, an Access Service Network (ASN) provides wireless access to broadband wireless access system subscribers and includes a BS and an ASN Gateway (ASN G/W). In operation, the ASN establishes Layer 2 connection between the BS and the MS and functions as a relay for establishing Layer 3 connection for the MS. In addition, the ASN provides Radio Resource Management capabilities.

Further in FIG. 1, a Connectivity Service Network (CSN) provides IP connectivity service to broadband wireless access system subscribers. More specifically, the CSN provides services such as internet access, HA for the mobile IP, Authentication, Authorization, and Accounting (AAA) proxy or server, a policy and admission control based on MS subscriber's profile, tunneling for roaming between CSNs, and billing for the MS subscribers.

The ASN G/W is located in the ASN and provides various services such as session mobility management, FA for the mobile IP, DHCP relay, DHCP server, ASN wireless resources management, location management, and paging.

Figure 2:
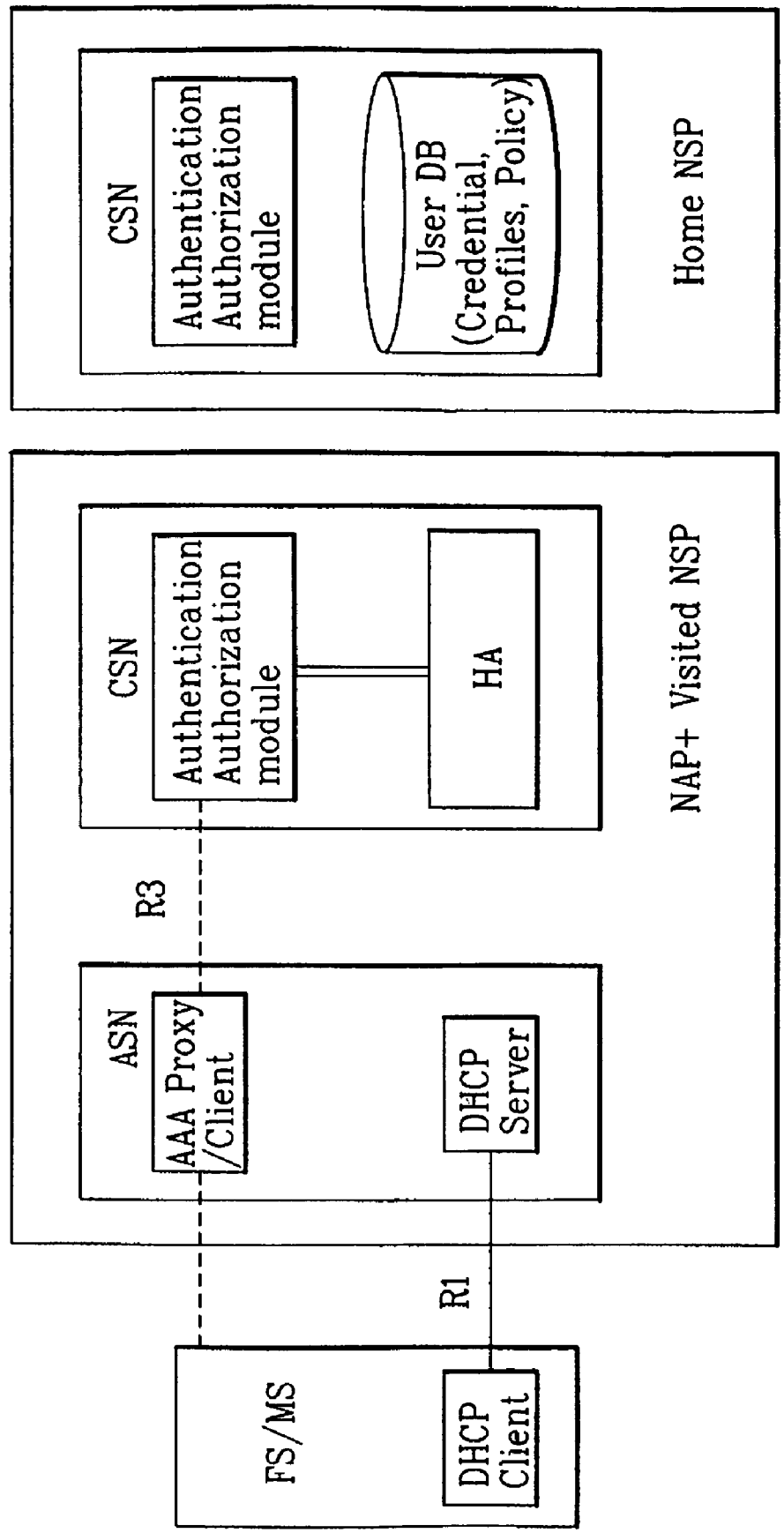
FIG. 2 illustrates an exemplary diagram of a broadband wireless access system when a Dynamic Host Configuration Protocol (DHCP) server is located in an Access Service Network (ASN)
Figure 3:
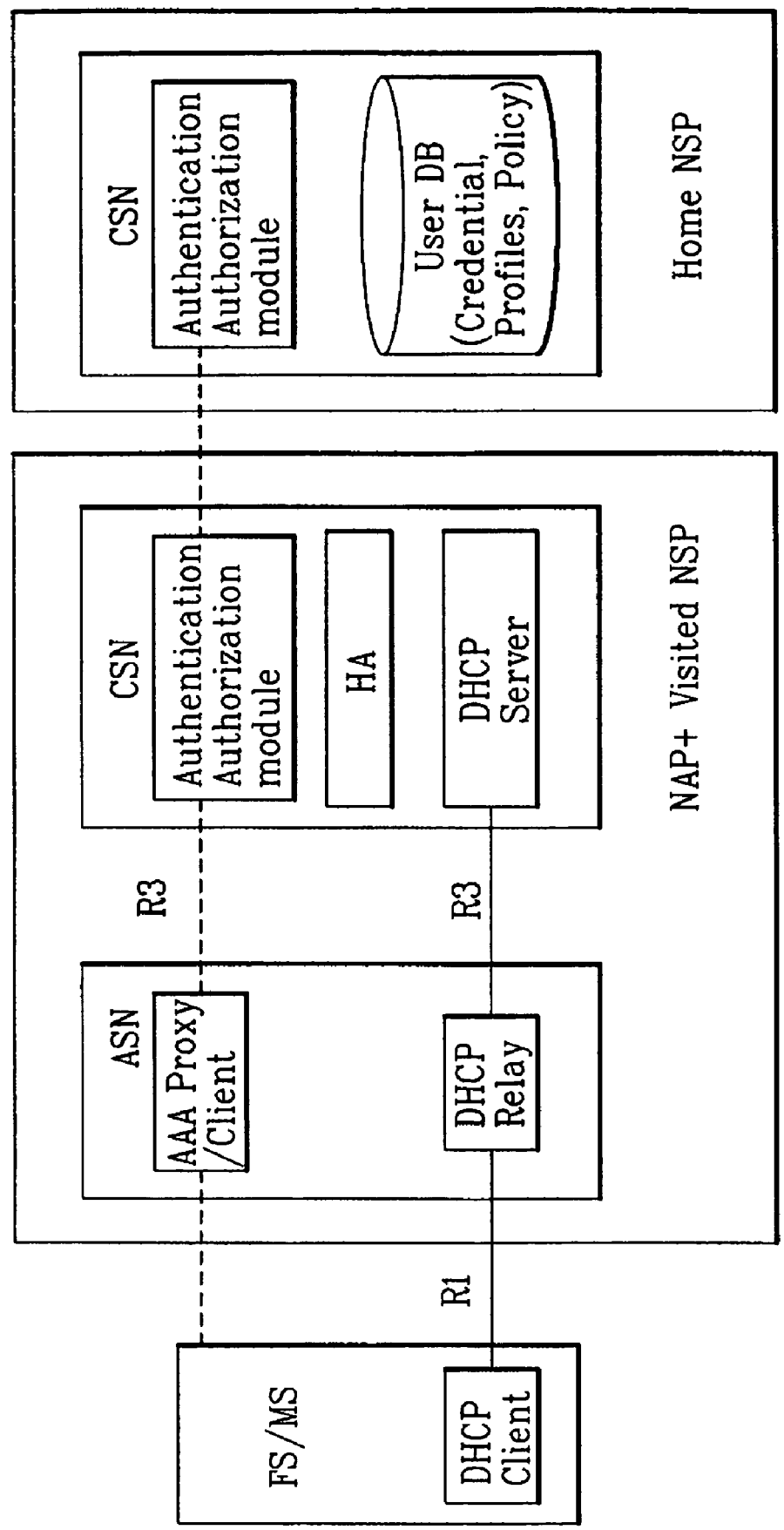
FIG. 3 illustrates an exemplary diagram of a broadband wireless access system when a DHCP server is located in a Connectivity Service Network (CSN)

FIG. 2 is an exemplary diagram illustrating a broadband wireless access system network when the DHCP server is located in the ASN. FIG. 3 illustrates an exemplary diagram of a broadband wireless access system when a DHCP server is located in the CSN.

In detail, FIGS. 2 and 3 illustrate service network structures of the broadband wireless access system. These service network structures allow the MS to receive a CoA allocated from the DHCP server regardless whether the FA exists or not exist in the ASN G/W.

Figure 4:
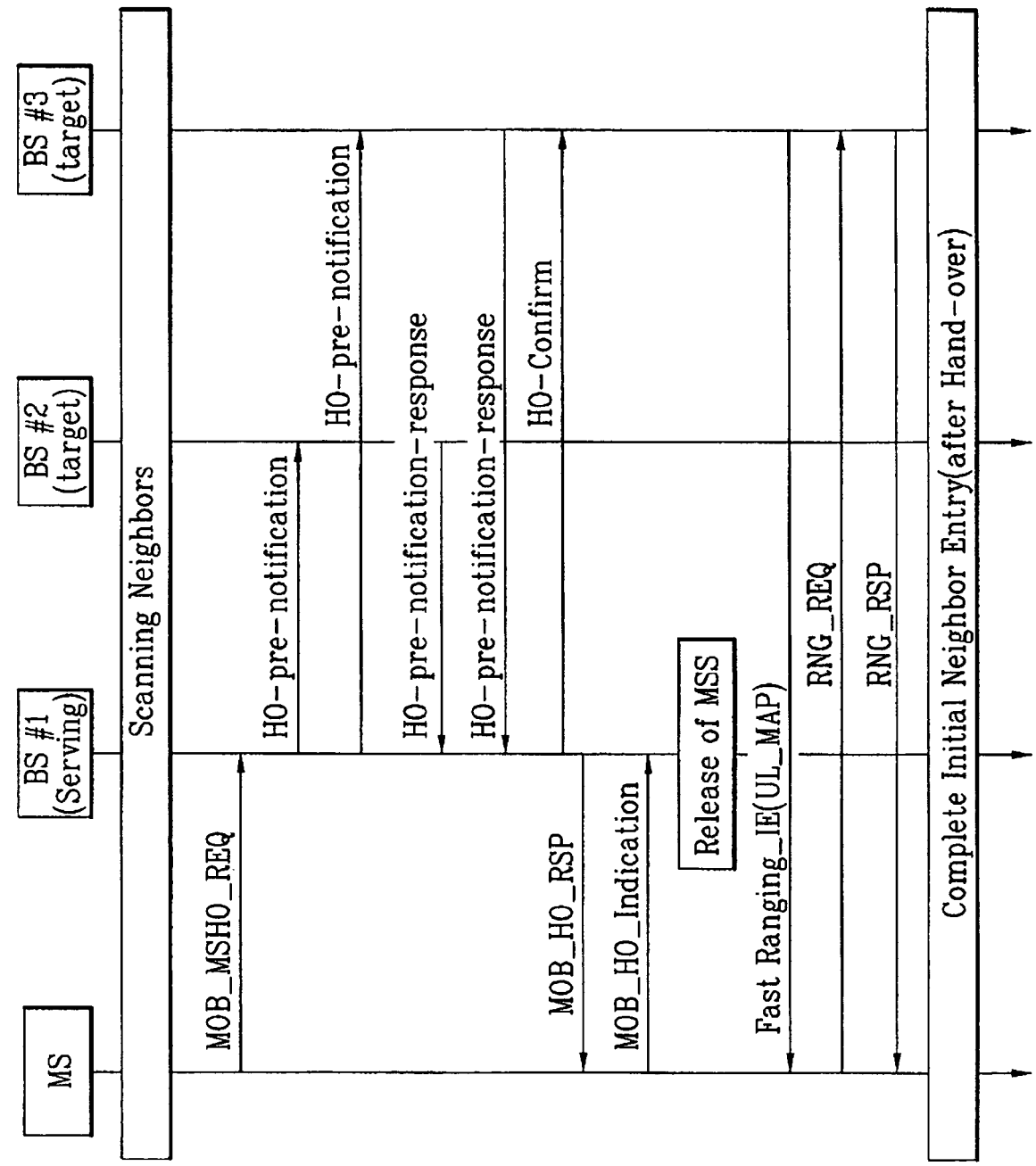
FIG. 4 illustrates an example of handover operation in a broadband wireless access system.

FIG. 4 illustrates an example of handover operation in a broadband wireless access system. In FIG. 4, the MS can acquire information on neighboring bases stations through scanning procedure and/or from neighboring base station (MOB-NBR-ADV) message(s).

The MS sends a handover request message to the serving BS to whose cell the MS belongs. In the handover request message, the MS includes information of recommended BSs acquired through scanning. The recommended BS is a BS to which the MS would prefer to perform handover.

Upon receiving the handover request message including the information of recommended BSs, the serving BS transmits a handover pre-notification (HO-pre-notification) message, which includes the MS identification and broadband and connection parameters, to each recommended BS. In response, the recommended BS transmits a handover pre-notification response (HO-pre-notification-rsp) message.

The serving BS receives and inspects the responses messages to determine the most appropriate target BS for handover. Once the target BS is determined, the serving BS transmits a handover confirmation (HO-confirm) message to the target BS while transmitting a handover response (MOB-HO-RSP) message to the MS.

As a last step before handover, the MS transmits a handover indication (MOB-HO-IND) message to the BS, and thereafter, performs ranging operation with the target BS.

Figure 5:
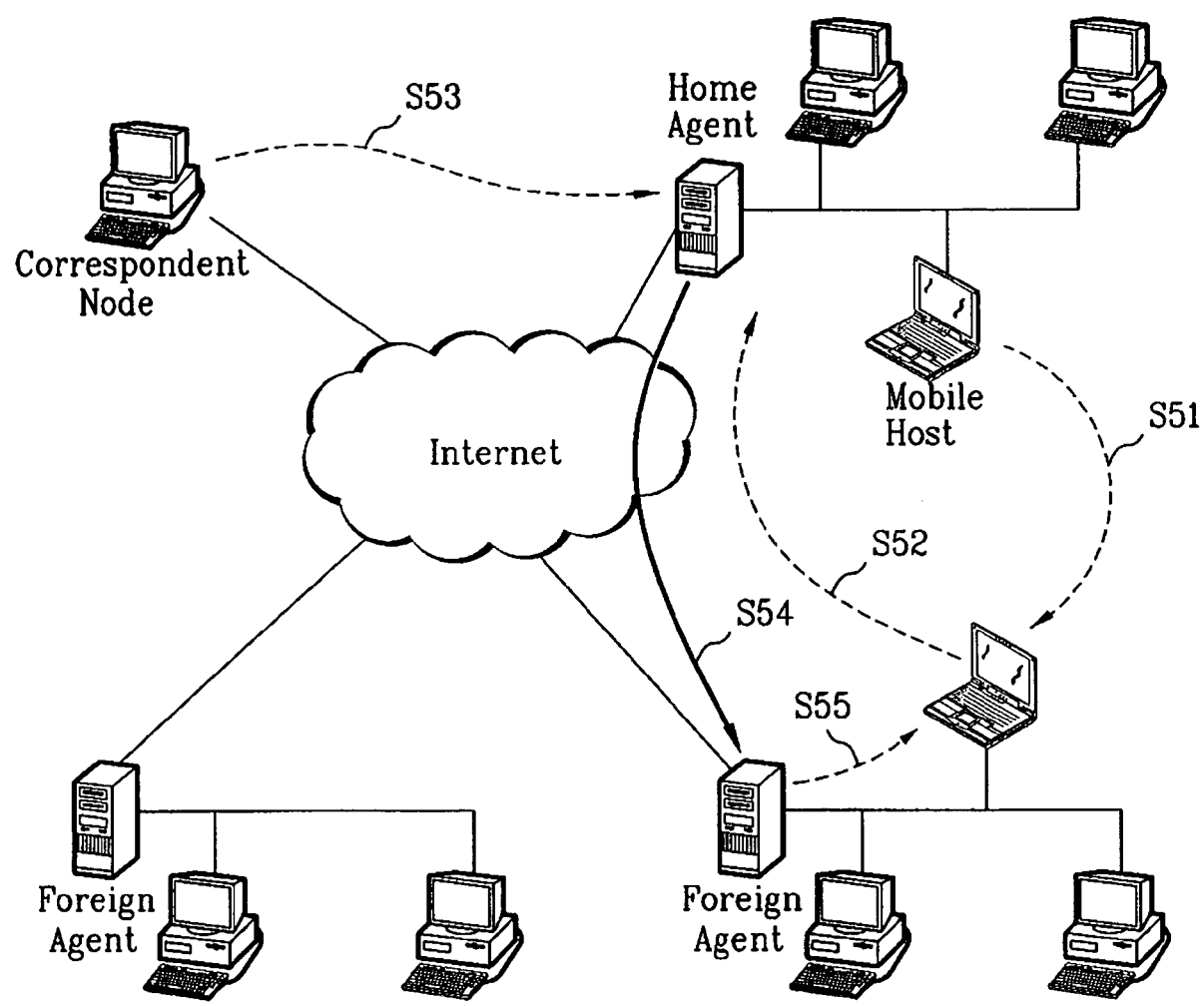
FIG. 5 is an exemplary diagram for illustrating operation of a mobile IPv4.

FIG. 5 is an exemplary diagram for illustrating operation of a mobile IPv4. In FIG. 5, the objective of the mobile IPv4 is to support transparent mobility in the higher layers, and to accomplish this, the mobile IPv4 requires the services or capabilities of a Mobile Host (MH), a Home Agent (HA), and a Foreign Agent (FA).

If a route optimization is not used, the BS corresponding to the MS does not need to make any changes. Here, the MH represents a mobile IP host, the HA retains information on the location of the MH, and a router performs tunneling operation to the FA or MH. The FA represents each a mobile router in the foreign network.

If the MH moves from a home network to a foreign network, the MH recognizes that it has moved out of the home network to a foreign network by receiving advertisement message(s) broadcasted by the foreign network. Upon recognition, the MH registers a CoA, which represents current (changed) location, with the HA of the home network (S51). Here, the CoA can be an IP address of the FA (FA-CoA) or a co-located CoA.

The data packets directed for the MH are transmitted to the home network, and these packets are received by the HA (S52). The HA then transmits the data packet to the MH by encapsulating the data packets and setting the FA's address as the destination address (S53). The encapsulated data packets are de-capsulated by the FA and then transmitted to the MH (S54). The data packet transmitted from the MH to the other host can be directly delivered by the FA, and in case of ingress filtering problem, the data packet can be transmitted by using the reverse tunneling (S55).

The key features necessary for the mobile IP are as follows. First, the agent discovery feature allows the MS to determine whether the MS is currently connected to its home network or located in the FA. Through this determination, the MS can realize whether the MS has moved to a different network.

The mobile IP expands an existing Internet Control Message Protocol (ICMP) Router Discovery (e.g., IETF RFC 1256) for agent discovery. The Agent Advertisement message, which is broadcasted periodically by the agent (e.g., HA or FA), includes a Mobility Agent Advertisement Extension in the ICMP Router Advertisement message. The Agent Solicitation message, which is transmitted by the MS to find the agent (e.g., HA or FA), uses the same method as used in the ICMP Router Solicitation.

When the MS detects that is has moved out of its home network area to a different network, the registration feature allows the MS to send information on its current location to the HA so that the MS can continue to receive the same service received at the home network.

In addition, the mobile IP represents two different types of registration procedures. First, if the MS uses the FA-CoA, the MS has to register with the FA, and second, if the MS uses the co-located CoA, the MS has to register directly with the HA.

When the MS is registered to a foreign network, the routing features represent necessary features for performing routing operation on the datagram. The datagram is transmitted from the MS or transmitted/received from the MS. Furthermore, the datagram not only includes a unicast packet, but also multicast and broadcast packets.

The operations of the DHCP are as follows. In order for the DHCP to operate properly, the network should include at least one DHCP server and at least one DHCP client. In addition, proper operation of the DHCP would require a range of TCP/IP addresses, gateway addresses, and a subnet mask.

The DHCP client receives the TCP/IP address information from the DHCP server. This TCP/IP address is not permanent, rather, the TCP/IP address can expire after a specified time period. As such, the DHCP server should provide the TCP/IP address before the address expires to the DHCP client.

Figure 6:
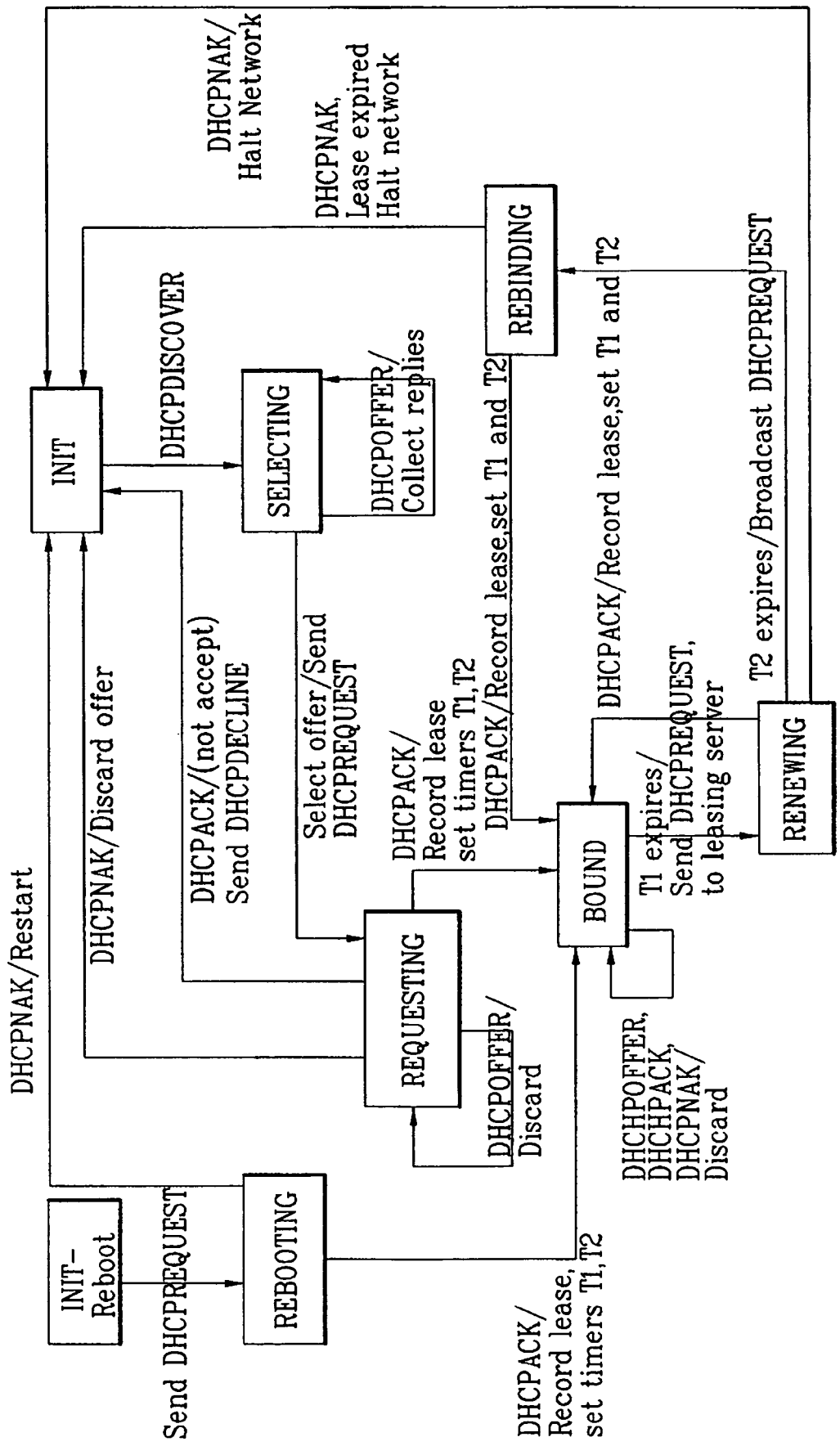
FIG. 6 is a diagram illustrating differences of each operation of a DHCP client according to an embodiment of the present invention.

FIG. 6 is a diagram illustrating differences of each operation of a DHCP client according to an embodiment of the present invention. As illustrated in FIG. 6, various operational DHCP processes include initializing (INIT), selecting (SELECTING), requesting (REQUESTING), binding (BOUND), renewing (RENEWING), and rebinding (REBINDING). The DHCP client receives and maintains the IP addresses through a plurality of handshake steps. Here, the handshake steps refer to transmission(s) and reception(s) of packets or signals.

Figure 7:
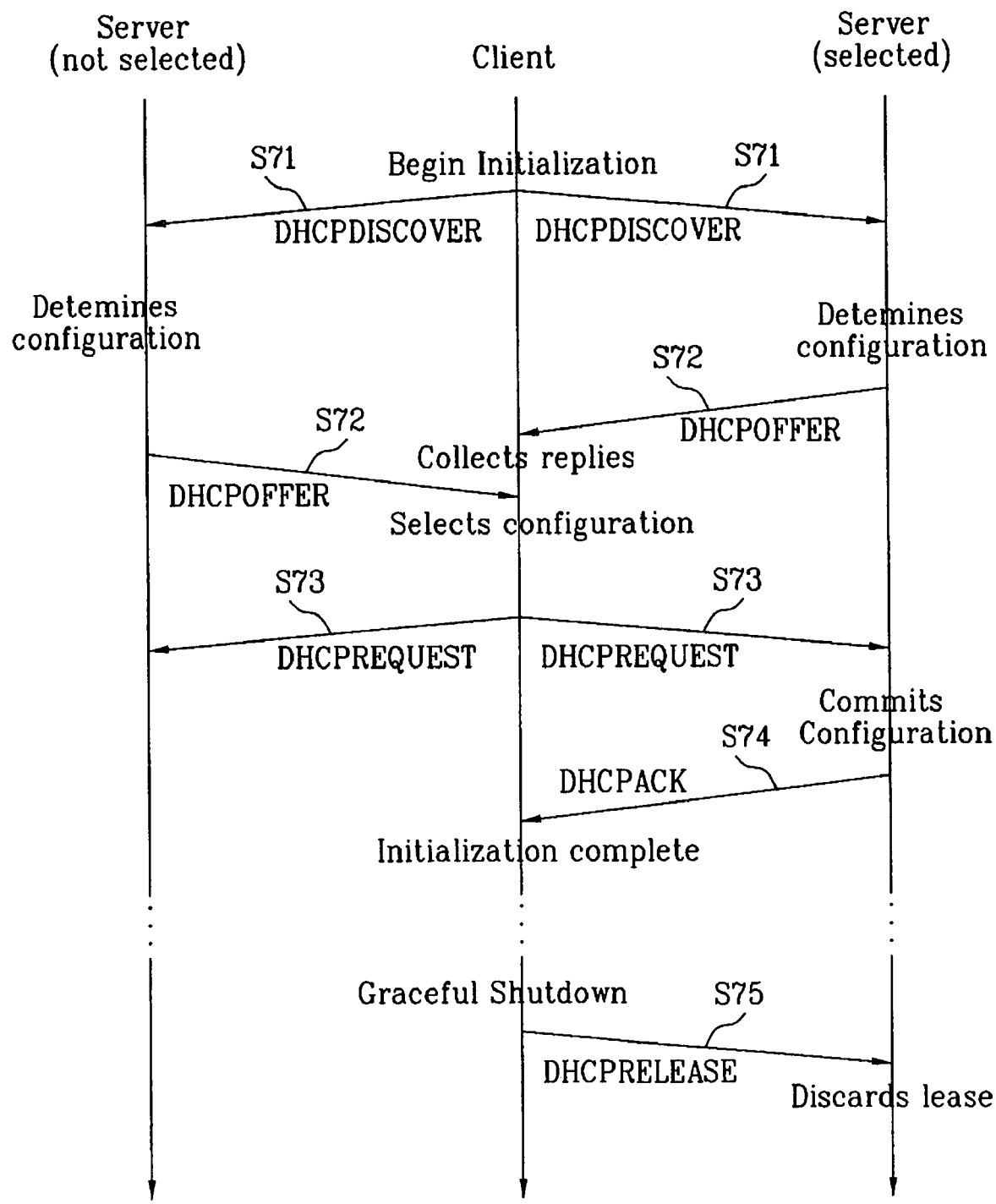
FIG. 7 illustrates an example of process in which a DHCP client automatically receives an IP address from a DHCP server.

FIG. 7 illustrates an example of process in which a DHCP client automatically receives an IP address from a DHCP server. In FIG. 7, the client broadcasts a DHCPDISCOVER packet to neighboring servers (S71). Upon receipt, each server responds by sending a DHCPOFFER packet to the client. Here, the client collects at least one reply (i.e., DHCPOFFER packet) from the servers (S72) and selects a configuration parameter and selects one server to notify the server of the selected configuration parameter. Thereafter, the client broadcasts a DHCPREQUEST packet which includes the selected configuration parameter (S73). If the server determines after receiving the DHCPREQUEST packet that it was not selected, it is considered as if the client has rejected the DHCPOFFER packet.

On the other hand, if the server determines after receiving the DHCPREQUEST packet that it has been selected, the selected server transmits a DHCPACK packet, including the requested client's address configuration information, to the client (S74). The client configures the address after it receives the DHCPACK packet from the server. However, if the client receives a DHCPNACK packet, the processes (S71-S73) are repeated.

After the client configures the address, the client can return the address to the server by transmitting a DHCPRELEASE packet to the server (S75).

In the initialization process, the client performs normal booting operation and loads an empty TCP/IP address. Thereafter, the client broadcasts a DHCPDISCOVER packet to the network. Here, the DHCPIDSCOVER packet can include information, such as a name of a workstation, a Medium Access Control (MAC) address, and the last TCP/IP address acquired from the server, for sending the client's request message to the DHCP server. The server can use the information to provide the client with the same address as the last requested address.

If the DHCP server in operation receives the DHCPDISCOVER packet, the selection process is initiated. The server organizes the addresses from the list stored therein and broadcasts the replies to the workstation (e.g., MS). In the DHCPOFFER packet, information on TCP/IP address proposed for the workstation, a workstation MAC address, a subnet mask, a length of a lease period, and the TCP/IP address of the DHCP server, currently in operation.

Here, the DHCP server should send broadcast messages via the network in order to communicate with the DHCP client. Because the TCP/IP is not yet configured for point-to-point communication in the client, the DHCP server and the workstation need to begin broadcasting.

The request state commences after the client receives the DHCPOFFER packet. The client generates the DHCPREQUEST packet, and this DHCPREQUEST packet uses the TCP/IP address provided by the server which transmitted the DHCPOFFER packet. The DHCPREQUEST packet includes the TCP/IP address of the DHCP server which provides the client's address. If the DHCP client needs information such as a default gateway, WINS, or DNS address, the DHCP client includes the request in the packet. If there are two or more DHCP servers in the network, the DHCP client can receive two or more DHCPOFFER packets. In such a situation, the DHCP client selects any one of the two servers.

In order to complete the request state, the DHCP client broadcasts the DHCPREQUEST packet to all the DHCP servers. All of the DHCP servers in the network receive the DHCPREQUEST packet and compares the address included in the DHCPREQUEST packet to its address. If the DHCP server's address does not coincide (or not identical) with the address included in the DHCPREQUEST packet, the DHCP server releases the address included in its specified DHCPOFFER packet.

If the DHCP server discovers its TCP/IP address in the DHCPREQUEST packet, the DHCP server transmits a reply by using the DHCPACK packet. In the DHCPACK packet, lease information of the DHCP client and additional information requested by the DHCP client are included therein.

If the DHCP client receives DHCPACK packet, the address assigned via the DHCPACK packet and the TCP/IP protocol currently executed in its network card and binding process begins and then completes the booting (powering on) operation. Here, the DHCP client can use the TCP/IP to communicate with the network. The DHCP client can maintain internally assigned TCP/IP address for a user selected length of lease period or until the user manually terminates. If the DHCP client continues to be in operation but the lease period is not extended, then the assigned lease period ends.

Figure 8:
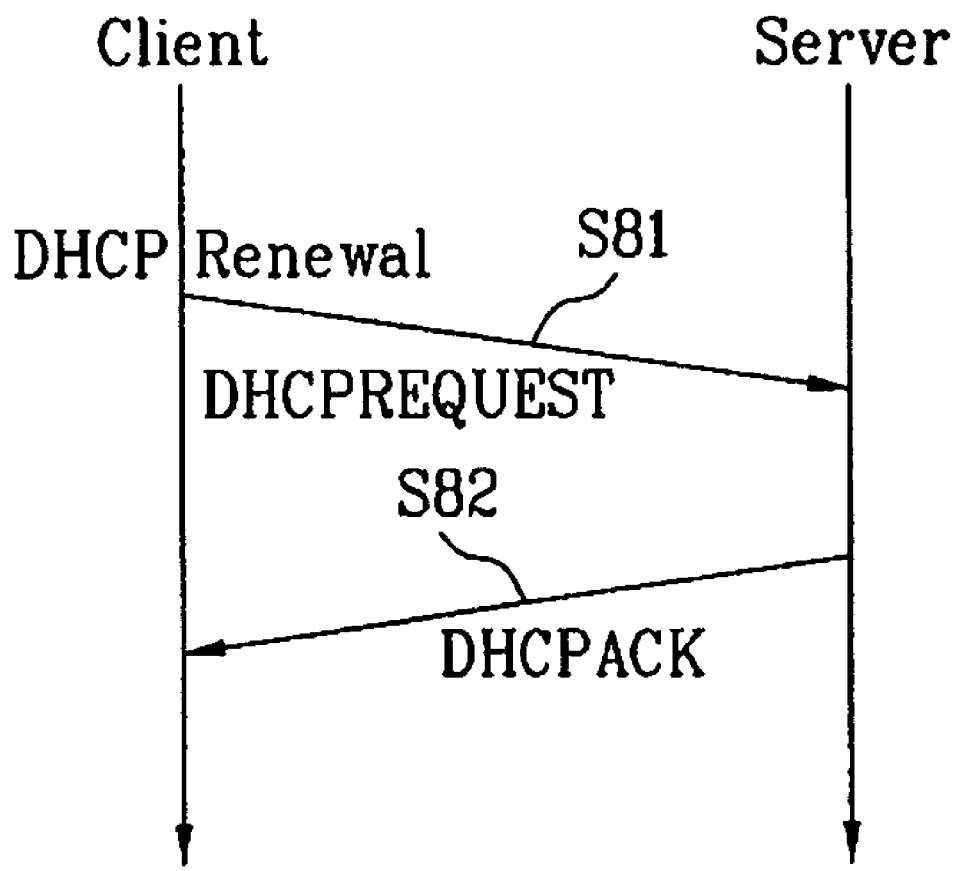
FIG. 8 illustrates an exemplary method of renewing an IP address during an IP address lease period according to the present invention.

FIG. 8 illustrates an exemplary method of renewing an IP address during an IP address lease period according to the present invention. As illustrated in FIG. 8, the DHCP client enters a new procedure when there is less than 50% left in the assigned lease period. The new stage comprises, first, transmitting a DHCPREQUEST packet to the server which assigned the current TCP/IP address (S81). Upon receipt, the DHCP server renews or extends the lease period and transmits a DHCPACK packet to the client (S82). The DHCPACK packet includes new lease information to be configured after renewal and the configuration information If the DHCP client cannot communicate with the DHCP server which granted lease of the TCP/IP address, normal operation continues despite error message being indicated. If more than 87.5% of the DHCP client's lease period has been used up, the DHCP client enters a rebinding process.

In the rebinding process, the DHCP client broadcasts the DHCPREQUEST packets through the network to all DHCP servers so that each DHCP server can receive the packet and send replies. In response, the DHCP server can send the initially assigned TCP/IP address via the DHCPACK packet to allow the DHCP client to continue to use the same TCP/IP address. Alternatively, the DHCP server can send a DHCP-NAK packet to have the DHCP client to re-initialize the TCP/IP address and receive a new TCP/IP address. If the DHCP client receives the DHCPHAK packet, the DHCP client performs all the processes starting with the initial processing.

However, if the DHCP client fails to communicate with the DHCP server before the lease period expires, the DHCP server interrupts (halts) the network by using the assigned TCP/IP address. Here, the DHCP client can no longer communicate with a workstation (e.g., MS) of another network using the TCP/IP address. However, the DHCP client can broadcast the DHCPREQUEST packets for network re-entry processing to receive a new TCP/IP lease period.

Figure 9:
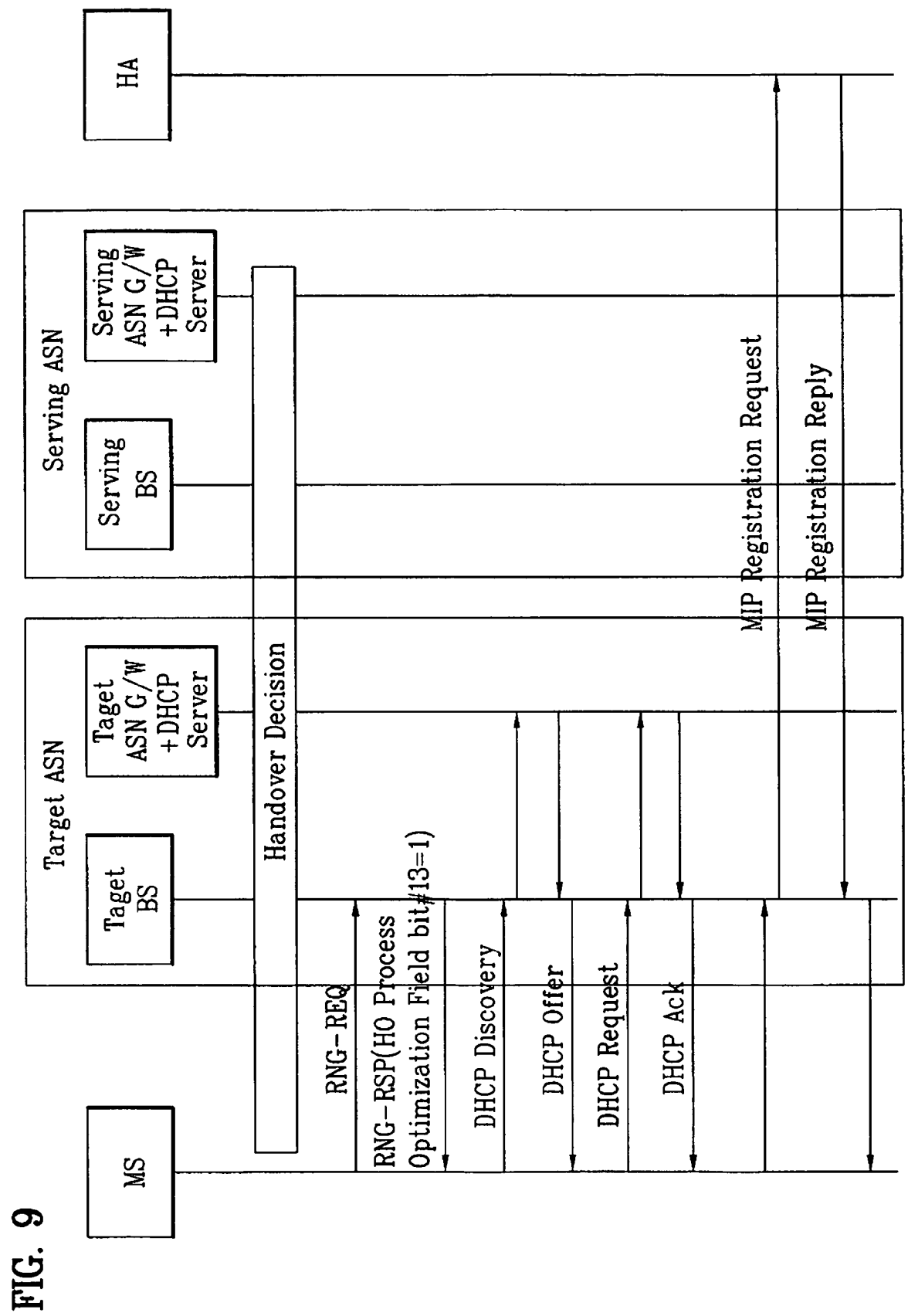
FIG. 9 is an example illustrating a process of reconfiguring an IP address by DHCP server located in an ASN during handover to a BS in an ASN of a et.

FIG. 9 is an example illustrating a process of reconfiguring an IP address by a MS using a DHCP server located in an ASN during handover to a BS in an ASN of a different subnet. As illustrated in FIG. 9, after the MS decides to perform handover to a target BS, the MS transmits a ranging request (RNG-REQ) message to that target BS in the different subnet of a network. When the subnet of the MS changes, the target BS sets a value of the Handover (HO) Process Optimization field is 1 bit (e.g., bit#13=1), and transmits the ranging response (RNG-RSP) message which includes the HO Process Optimization field. Here, the HO Process Optimization field can be represented by whether IP address refreshing is required or not. If the IP address needs to be refreshed, the IP address refresh parameter triggers a higher layer protocol to refresh the IP address. Moreover, the IP address can be refreshed at the network or alternatively, at the gateway, which can include a FA.

Thereafter, the MS broadcasts a DHCP Discovery message for reconfiguring the TCP/IP address. In response to the broadcast, the DHCP server transmits a DHCP Offer message. The DHCP offer message can include a result of the search of the network for IP addresses. After receiving the DHCP Offer message from the server, the MS broadcasts a DHCP request message to the DHCP server located in the network. Thereafter, the DHCP server responds by transmitting via the BS configuration information of a host included in the DHCPACK message. Lastly, the MS registers with a home agent (HA) using the IP address provided in the DHCPACK message.

Figure 10:
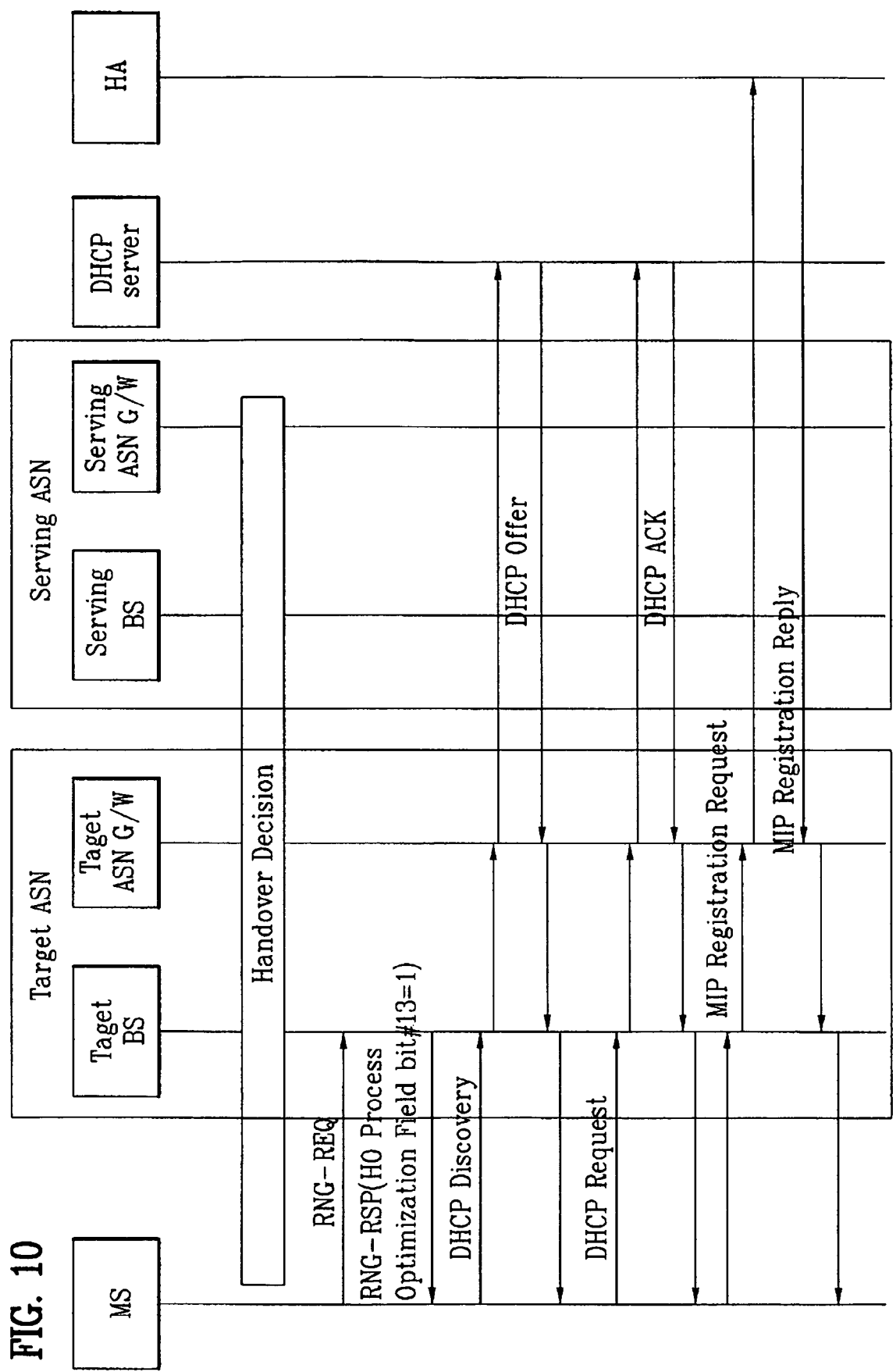
FIG. 10 is an example illustrating a process of reconfiguring an IP address using a DHCP server located in a CSN during handover to a BS in a different subnet.

FIG. 10 is an example illustrating a process of reconfiguring an IP address by a MS using a DHCP server located in a CSN during handover to a BS in a different subnet. The operation is similar to that of FIG. 9 with an exception that the DHCP server is located in the CSN.

Figure 11:
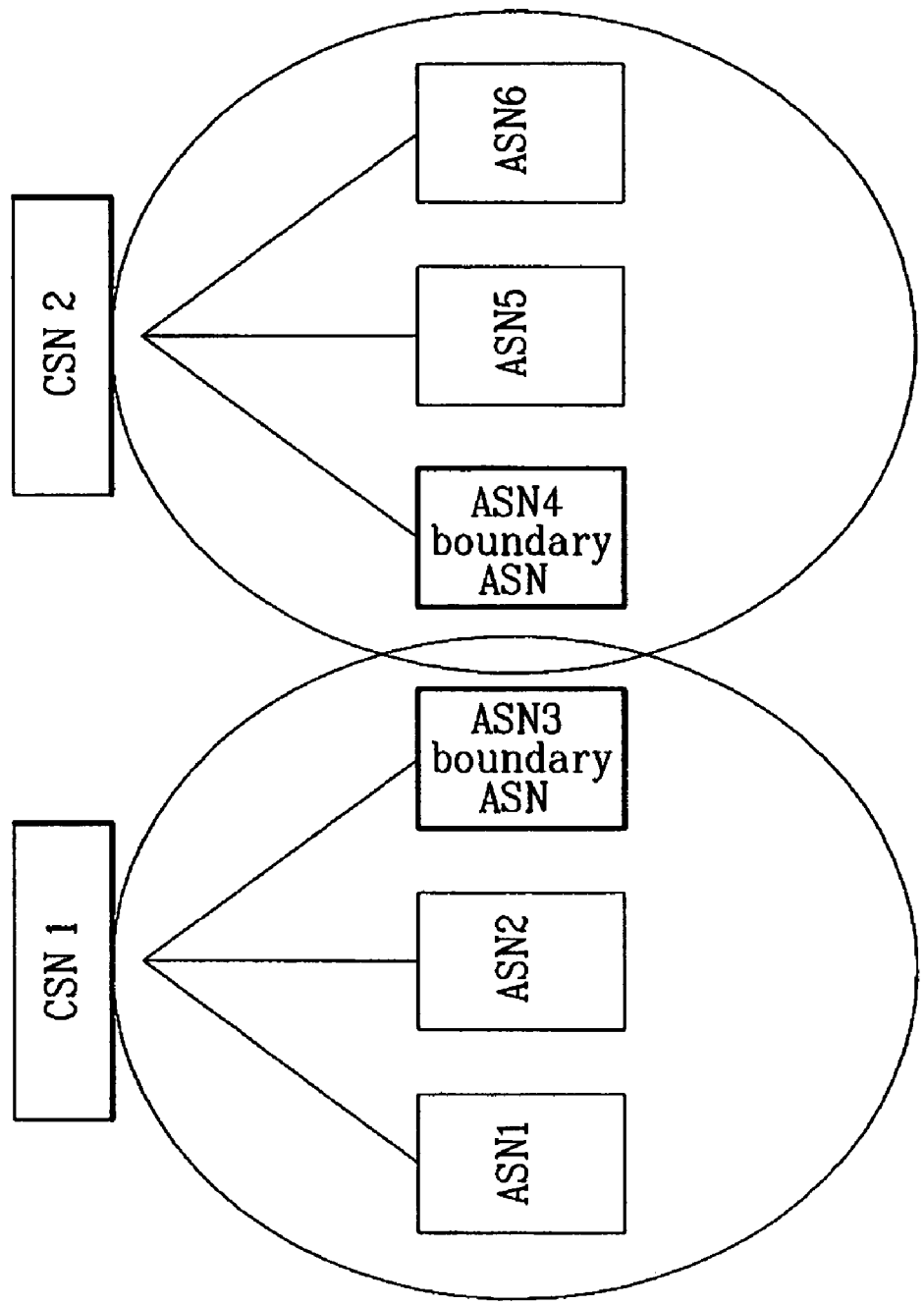
FIG. 11 is an exemplary diagram illustrating a boundary of an ASN in a comprised of a plurality of ASNs.

FIG. 11 is an exemplary diagram illustrating a boundary of an ASN in a CSN comprised of a plurality of ASNs. In FIG. 11, if the DHCP server is located in the CSN, the processes are applicable only to those ASNs located near the boundary or along the edge. More specifically, if the DHCP is located in the CSN, a boundary ASN gateway maintains a DHCP address pool, containing available IP addresses at the DHCP server. The purpose of maintain the DHCP address pool is to quickly provide CoAs to the MS when the subnet of the MS changes while the MS is requesting handover.

Table 6 is an example of a DHCP address pool.

TABLE 6

| IP Address | Lifetime (seconds) |
|---|---|
| IP Address 1 | 300 |
| IP Address 2 | 500 |
| IP Address 3 | 1000 |
| ....... | ....... |

The ASN gateway supplies the IP addresses from the DHCP address pool so that the MS can maintain a fixed number of IP addresses, and thereafter receives new IP addresses from the DHCP server. Furthermore, the ASN gateway renews or extends the lifetime of each IP address in the DHCP address pool before it expires through the DHCP server.

The effective period of each IP addresses stored in the DHCP address pool is measured (or begins to count down) from the time the IP address is assigned from the DHCP server and not when the DHCP address pool receives the IP address. When the IP address from the DHCP address pool is assigned to a MS, the time remaining on the IP address is the time remaining after subtracting the elapsed time since the IP address is assigned from the DHCP server.

The MS transmits a RNG-REQ message to the target BS in order to handover to the target BS, and in response, receives a RNG-RSP message from the target BS. At this stage, if a specified bit (e.g., 1 bit) of the HO Process Optimization field, included in the RNG-RSP message, is configured to #13 bit=1, for example, the MS awaits to receive a DHCPACK message from the target BS. Here, the specified bit of the HO Process Optimization field signifies information that the MS is to change the subnet or move to a different subnet. If the DHCPACK message is not received before the expiration of T3 timer (See FIG. 13), the MS transmits a DHCP Discovery message to the target BS. When the MS receives an IP address reconfiguration indicator via a Medium Access Channel (MAC) message, the MS can operate in a same manner not only for operation associated with the HO Process Optimization of the RNG-RSP message but also in a different network which notifies whether the IP address is reconfigured in Layer 2.

Transmission of a value of T3 timer can be configured at the network (e.g., WiMAX network) during the process when the IP address is initially configures to the DHCP server. If the network fails to deliver the value of T3 timer, the IP address can be assigned absent this value during the IP address configuration process. As a result, in this situation, the MS uses a default value for T3 timer. Preferably, the T3 timer value is selected based on speed of service since the value is associated with resuming service quickly by the MS.

Table 7 illustrates an example of a T3 timer.

TABLE 7

DHCPACK Waiting Timer

| Code | Length | T3 Interval | | | |
|------|--------|-----|----|----|----|
| 62 | 4 | t1 | t2 | t3 | t4 |

If the BS transmits the RNG-RSP message including the specified bit of a HO Process Optimization field configured to '1,' (e.g., bit#13) the BS transmits a DHCP_ACK_Request message to the ASN gateway. After receiving the message, the MS transmits a DHCP-ACK message to the BS if the ASN gateway either comprises the DHCP server or manages the DHCP address pool.

Table 8 is an example illustrating a DHCP_Request message.

TABLE 8

| Syntax | Size | Notes |
|--------|------|-------|
| DHCP_ACK_Request_Message_Format( ){ | 8 bits | |
| Management Message Type=XX | | |
| HMAC Tuple | 21 bytes | |
| reserved | | |
| } | | |

Figure 12:
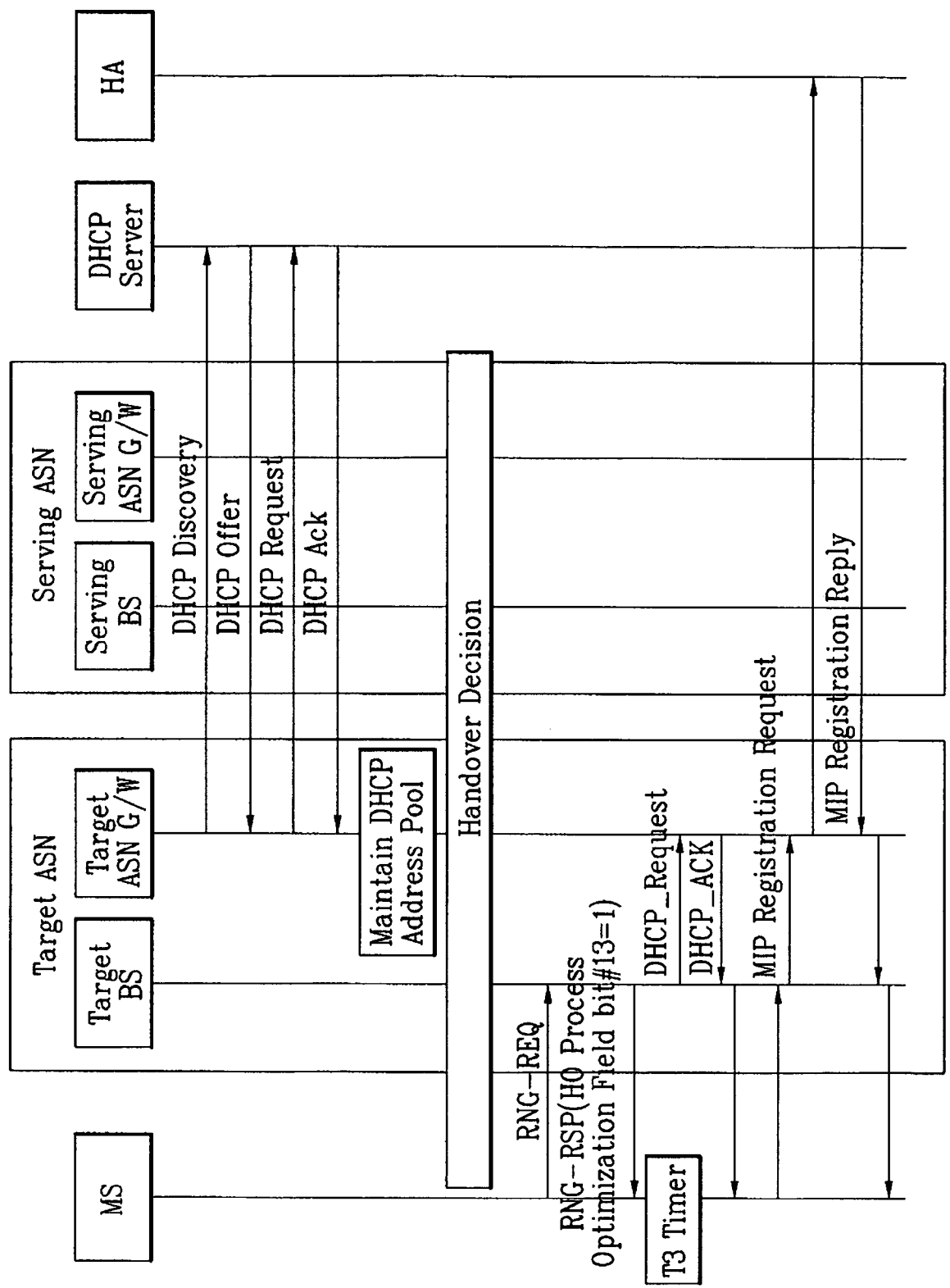
FIG. 12 is an example illustrating an IP address reconfiguring process by a address pool maintenance capability of a DHCP server, located in an ASN of a different subnet, during handover to a BS.

FIG. 12 is an example illustrating an IP address reconfiguring process by a address pool maintenance capability of a DHCP server, located in an ASN of a et, during handover to a BS. In FIG. 12, the ASN receives in advance addresses from the DHCP server by performing the DCHP address allocation hen maintains the DHCP address pool comprised of the available IP addresses. the MS transmits the RNG-REQ message in order to perform handover with As described above, the target BS responds by transmitting a RNG-RSP message which includes the specified bit of the HO Process Optimization field configured to '1,' (e.g.; bit#13).

If the RNG-RSP message includes the specified bit (e.g., bit#13) of the HO Process Optimization field is configured to '1,' the MS waits for a DHCP-ACK message and commences a T3 timer. If the RNG-RSP message transmitted from the target BS specified bit of the HO Process Optimization field bit#13 configured to '1,' the target BS makes a request to the ASN gateway to send the DHCP-ACK message. Upon request, the ASN gateway transmits the DHCP-ACK message to the MS via after, the MS registers the IP address included in the DHCP-ACK message to However, if the MS fails to receive the DHCP-ACK message before the expiration of the T3 timer, the MS transmits a DHCP Discovery message to the BS.

Figure 13:
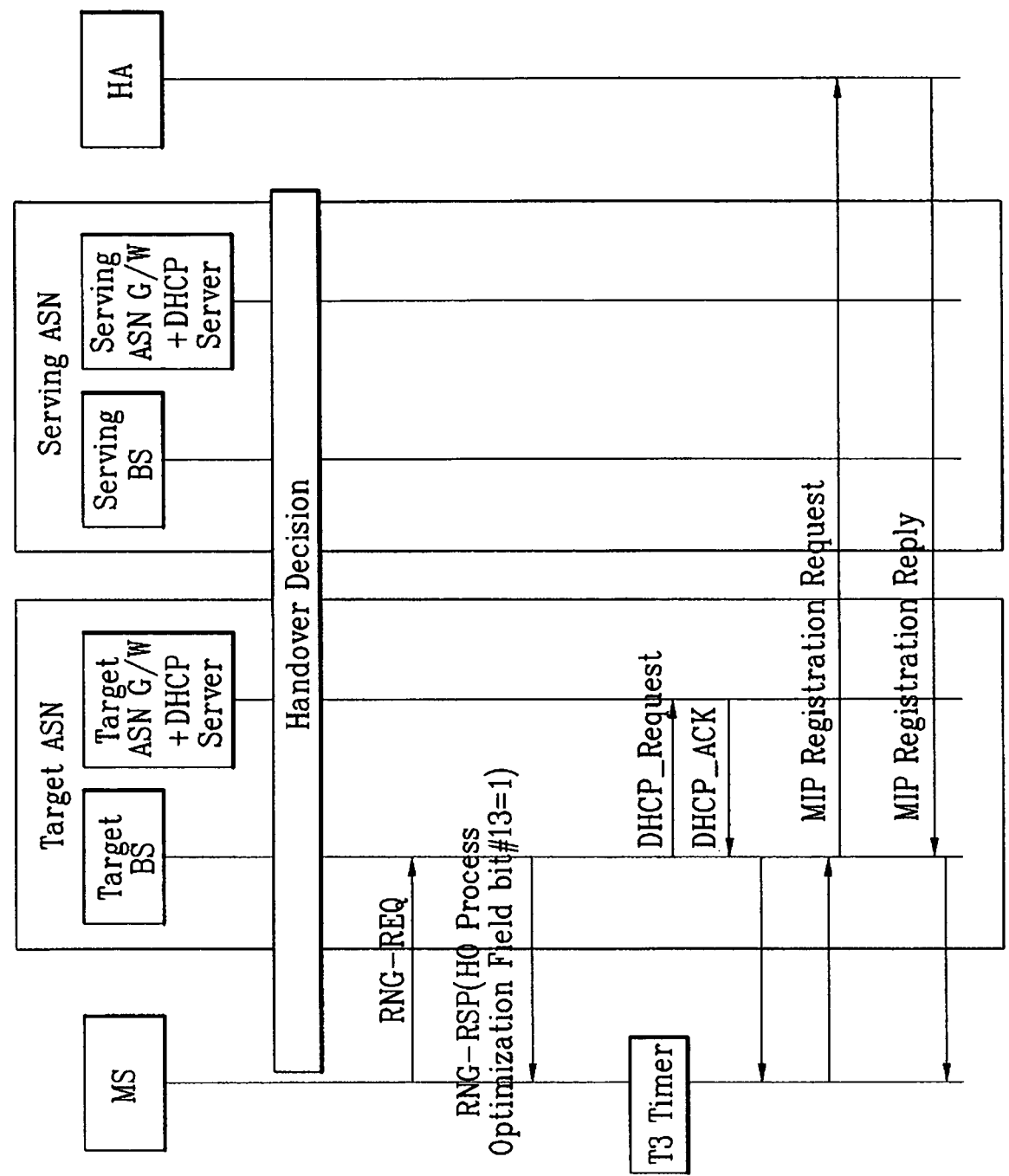
FIG. 13 is an example illustrating a process of assigning a DHCP address to an ASN gateway when a DHCP server is located in an ASN during handover ASN belonging to a different subnet.

FIG. 13 is an example illustrating a process of assigning a DHCP address to the MS from an ASN gateway when a DHCP server is located in an ASN during handover to a BS in an ASN belonging to a different subnet. In FIG. 13, the MS transmits a RNG-REQ message to a target BS in order to perform handover. The target BS responds by transmitting a RNG-RSP message which includes the specified bit (e.g., bit#13) of the HO Process Optimization field configured to '1,' for example.

If the RNG-RSP message includes the specified bit (e.g., bit#13) of the HO Process Optimization field is configured to '1,' the MS waits for a DHCP-ACK message and commences a T3 timer. If the RNG-RSP message transmitted from the target BS includes the specified bit of the HO Process Optimization field configured to '1,' the target BS makes a request to the ASN gateway to send the DHCP-ACK message. Upon receipt of the request, the ASN gateway transmits the DHCP-ACK message to the MS via the BS. Thereafter, the MS registers the IP address included in the DHCP-ACK message to the HA.

However, if the MS fails to receive the DHCP-ACK message before the expiration of the T3 timer, the MS transmits a DHCP Discovery message to the BS.

Figure 14:
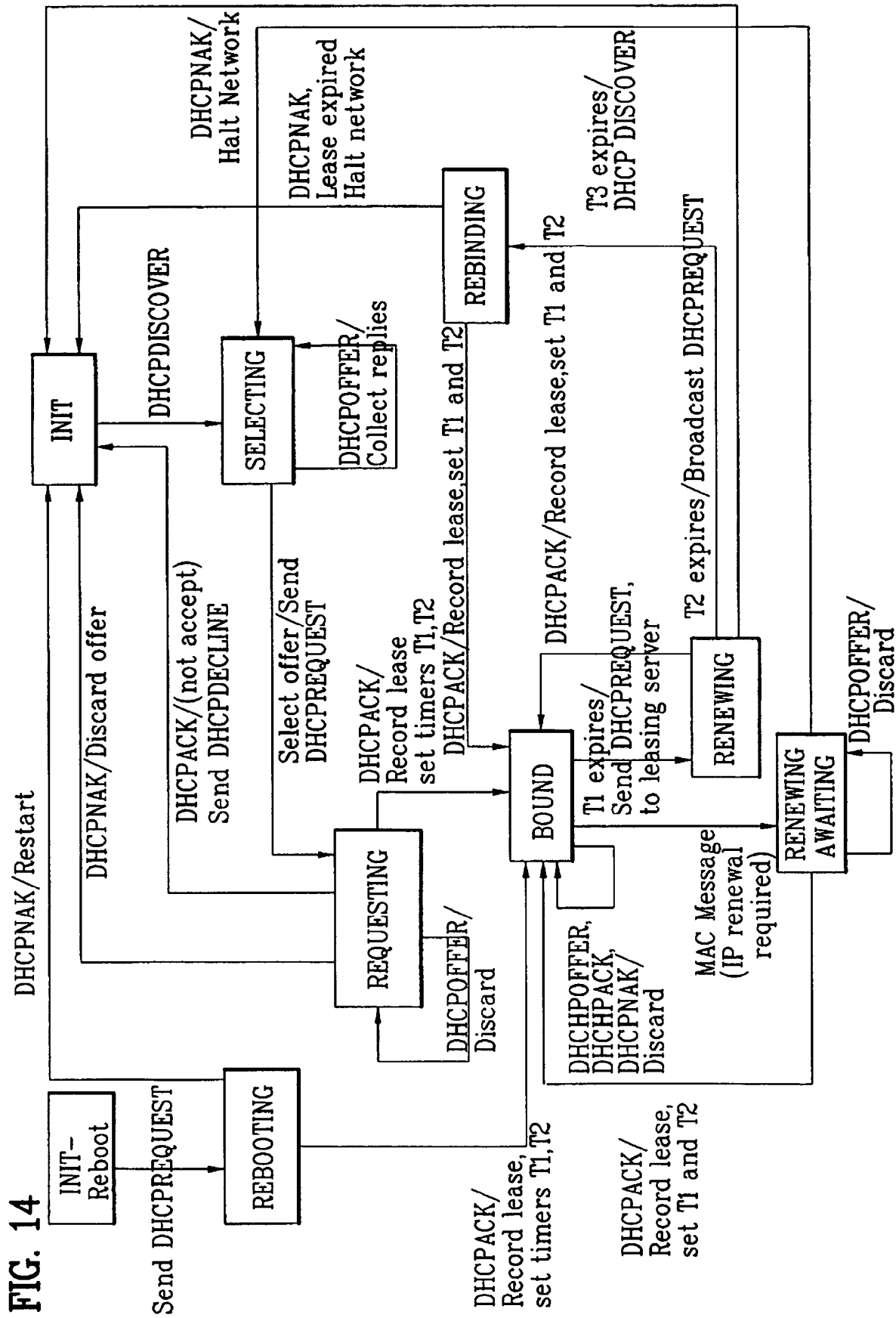
FIG. 14 is an exemplary diagram illustrating a flow of a DHCP states the specified bit of a HO Process Optimization field in the MS.

FIG. 14 is an exemplary diagram illustrating a flow of a DHCP states according to the specified bit of a HO Process Optimization field in the MS. In FIG. 14, a REWEWING AWAITING process take place after the MS receives a MAC message (e.g., IP renewal required) from Layer 2. As such, if the MS receives a DHCPACK message from either a DHCP server or a target BS during the REWEWING AWAITING process, the MS stores information related to the assigned IP address and configures T1 and T2 timers before moving on to a BOUND process.

If a T3 time expires during the BOUND process, the MS transmits a DHCPDISCOVER message and enters a SELECTING process in order to return to an earlier state to find a DHCP server. During this state, if the MS receives a DHCPOFFER message, this message is ignored.

A method of assigning a DHCPACK message in advance can be applied to other technical fields regardless of the configurations of the ASN and/or CSN as long as the method is supported by similar wireless communication network.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reconfiguring an internet protocol (IP) address during handover by a mobile station (MS), the method comprising:
    (a) transmitting a ranging request message to a base station (BS) in a network;
    (b) receiving a ranging response message including an IP address refresh parameter from the BS in the network, wherein the IP address refresh parameter indicates whether or not IP address refreshing is required;
    (c) transmitting an IP address configuration network entity search message via the BS;
    (d) receiving an IP address configuration network entity search result message from the network via the BS;
    (e) transmitting an IP address configuration request message to the network via the BS; and
    (f) receiving an IP address configuration response message, through which and IP address is assigned, from the network via the BS,
    wherein the IP address refresh parameter triggers a higher layer protocol to refresh the IP address if the IP address refreshing is required.

2. The method of claim 1, wherein the network includes at least one entity, wherein the entity is any one of the BS, a gateway, a router, a foreign agent (FA), a home agent (HA), a Dynamic Host Configuration Protocol (DHCP) server, and a DHCP relay.

3. The method of claim 1, wherein the steps (c)-(f) are excluded if the IP address refresh parameter indicates that the IP address refreshing is unnecessary.

4. The method of claim 3, wherein the IP address is refreshed at the network, wherein the network is the gateway.

5. The method of claim 3, wherein the IP address is refreshed at the network, wherein the network is the gateway which includes the FA.

6. The method of claim 1, wherein the IP address configuration network entity search message is a Dynamic Host Configuration Protocol (DHCP) discover message.

7. The method of claim 1, wherein the IP address configuration network entity search result message is a Dynamic Host Configuration Protocol (DHCP) offer message.

8. The method of claim 1, wherein the IP address configuration request message is a Dynamic Host Configuration Protocol (DHCP) request message.

9. The method of claim 1, wherein the IP address configuration response message is a Dynamic Host Configuration Protocol (DHCP) acknowledgment message.

10. The method of claim 1, wherein the IP address refresh parameter is a parameter of a handover process optimization field.

11. The method of claim 10, wherein the parameter of the handover process optimization field is 1 bit.

12. The method of claim 1, further comprising registering a refreshed IP address configuration to an entity of the network after receiving the IP address configuration response message.

13. The method of claim 12, wherein the entity of the network is a gateway or a home agent.

14. The method of claim 12, wherein the refreshed IP address configuration is included in the IP address configuration response message.

15. A method of reconfiguring an internet protocol (IP) address during handover by a mobile station (MS), the method comprising:
   (a) transmitting a ranging request message to a base station (BS) in a network;
   (b) receiving from the BS in the network a ranging response message including an IP address refresh parameter which indicates whether or not IP address refreshing is required; and
   (c) receiving from a first entity of the network an IP address configuration response message through which an IP address is assigned, wherein the IP address configuration is attained by the first entity of the network from a second entity of the network,
   wherein the IP address refresh parameter triggers a higher layer protocol to refresh the IP address if the IP address refreshing is required, and
   a process of attaining the IP address configuration includes:
      transmitting an IP address configuration request message to the second entity of the network; and
      receiving an IP address configuration response message from the second entity of the network.

16. The method of claim 15, further comprising a timer set and initiated by the MS, wherein the timer is a specified time period during which the MS waits to receive the IP address configuration from the first entity of the network.

17. The method of claim 15, wherein the IP address configuration request message is a Dynamic Host Configuration Protocol (DHCP) request message.

18. The method of claim 15, wherein the IP address configuration response message is a Dynamic Host Configuration Protocol (DHCP) acknowledgment message.

19. The method of claim 15, wherein the IP address configuration request message is a Mobile IP Agent Solicitation message.

20. The method of claim 15, wherein the IP address configuration response message is a Mobile IP Agent Advertisement message.

21. The method of claim 15, further comprising registering a refreshed IP address configuration to an entity of the network after receiving the IP address configuration response message.

22. The method of claim 21, wherein the entity of the network is a gateway or a home agent.

23. The method of claim 21, wherein the refreshed IP address configuration is included in the IP address configuration response message.

24. The method of claim 15, further comprising:
   (a) transmitting an IP address configuration network entity search message from the first entity of the network to the network;
   (b) receiving an IP address configuration network entity search result message from the second entity of the network;
   (c) transmitting an IP address configuration request message from the first entity of the network to the second entity of the network;
   (d) receiving an IP address configuration response message from the second entity of the network; and
   (e) storing at least one IP address configuration at the first entity of the network acquired through steps (a)-(d).

25. The method of claim 24, wherein steps (c)-(d) are repeated to attain a desired number of IP address configurations.

26. The method of claim 15, further comprising, if search for the second entity is unnecessary,
   (a) transmitting an IP address configuration request message from the first entity of the network to the second entity of the network;
   (b) receiving an IP address configuration response message from the second entity of the network;
   (c) storing at least one IP address configuration at the first entity of the network acquired through steps (a)-(b).

27. The method of claim 15, further comprising registering a refreshed IP address configuration to an entity of the network after receiving the IP address configuration response message.

28. The method of claim 27, wherein the entity of the network is a gateway or a home agent.

29. The method of claim 27, wherein the refreshed IP address configuration is included in the IP address configuration response message.

30. A method of reconfiguring an internet protocol (IP) address during handover in a network, the method comprising:
   (a) receiving by a base station (BS) a ranging request message from a mobile station (MS);
   (b) transmitting by the BS a ranging response message including an IP address refresh parameter indicating whether or not IP address refreshing is required;
   (c) receiving from the MS an IP address configuration network entity search message;
   (d) transmitting to the MS an IP address configuration network entity search result message;
   (e) receiving an IP address configuration request message from the MS; and
   (f) transmitting an IP address configuration response message, through which and IP address is assigned, to the MS.

* * * * *